Figure 1:
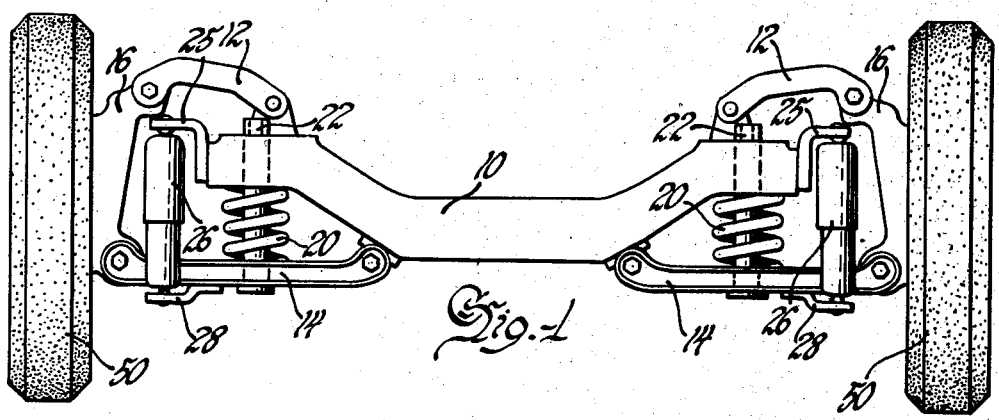

July 7, 1959

C. R. HAGLER 2,893,751

VEHICLE ANTI-ROLL DEVICE AND POWER STEERING CONTROL THEREFOR

Filed Dec. 27, 1954

INVENTOR
Charles R. Hagler
BY
C. H. Dilke
ATTORNEY

United States Patent Office 2,893,751
Patented July 7, 1959

2,893,751

VEHICLE ANTI-ROLL DEVICE AND POWER STEERING CONTROL THEREFOR

Charles R. Hagler, Flint, Mich., assignor to General Motors Corporation, Detroit, Mich., a corporation of Delaware Application December 27, 1954, Serial No. 477,638

7 Claims. (Cl. 280—112)

This invention concerns a scheme for preventing or lessening the roll of a vehicle body due to centrifugal force in the negotiation of a turn or curve and has particular relation to vehicles equipped for power steering.

The principal object of the invention is to gain the advantage provided by an anti-roll contrivance for vehicles so equipped, by means having co-action with the power steering control.

Other objects and features of the invention will be apparent from the later description.

In general, there are three types of power steering mechanisms available for use today—mechanical, electrical, and fluid. These mechanisms have in common a control part directly or indirectly manually actuated to bring into play the power means operably connected to a steering part. The nature of this control part, of course, varies with the nature of the mechanism. Thus, in the case of a mechanical gear, the control part may be a nut or threaded sleeve which is caused to move axially on the steering shaft in a direction determined by the direction of rotation of the shaft to energize one of a pair of oppositely rotating clutches, the driven components of which are arranged to power the shaft. In the case of an electrical power steering apparatus, the control part is normally a switch actuated by the steering shaft so as to energize a circuit including a reversible electric motor suitably arranged to power the shaft or another steering member. In the case of a power steering system actuated through fluid pressure, the control part is a valve rotated or reciprocated on turning of the steering shaft, the valve normally controlling the flow of a pressure fluid between a fluid motor operatively linked to a steering member and a source of fluid pressure, generally a pump powered from the engine of the vehicle through a suitable take-off. Alternatively, the valve may be disposed in a line interconnecting the motor and the exhaust manifold of the engine, for example, in which event actuation of the motor is induced by atmospheric pressure.

In accordance with the present invention, I associate with the suspension springs of the power steering-equipped vehicle, individual fluid pressure-responsive devices capable when activated of preventing or reducing deflection of the springs, which, incidentally, need not be fabricated of metal, the invention being also applicable, for instance, to suspension springs of the pneumatic or hydraulic type. The activation of the devices is under the control of the power steering control member and is selective with respect to the two sides of the vehicle. Accordingly, on the negotiation of a turn the springs which would normally tend to deflect from the effects of centrifugal force, with outward roll of the vehicle body, are in effect stiffened, relative transverse angular movement between the body and the road wheels during the turn being thus made hardly appreciable, with resultant improvement in the handling qualities of the vehicle.

Figure 2:
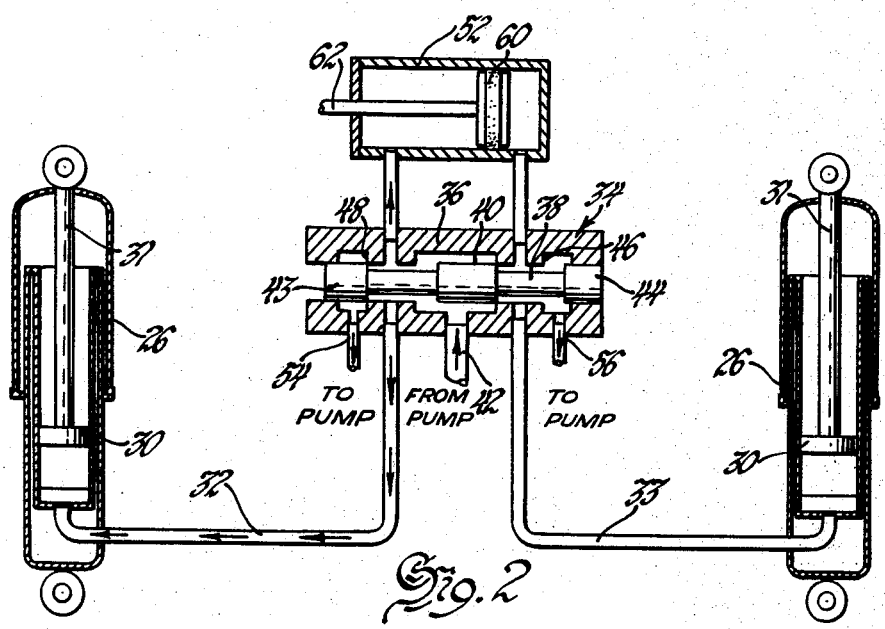

I shall particularly describe my invention in terms of its application to a vehicle having independently sprung dirigible wheels and equipped with a power steering system of the hydraulic type. In the accompanying drawings with reference to which the further description will proceed:

Fig. 1 is a front elevation;

Fig. 2 diagrammatically illustrates the relation between the power steering control valve and the fluid pressure-responsive devices preventing vehicle roll.

Referring first to Fig. 1, the numeral 10 denotes the front axle or cross frame member of the vehicle. Hingedly connected thereto are upper control arms 12 and lower control arms 14. Each of the arms 12 and 14 is similarly connected at its outward end to a steering knuckle support 16 through which the familiar king pins, not shown, extend. A coil spring 20 seats on each of the arms 14, which have a width at least commensurate with the diameter of the springs, and engages the under surface of the axle 10. Each spring has a guide 22 extending centrally therethrough.

All of the parts just described are conventional, the suspension represented being of the well known "wishbone" type.

In accordance with the invention, as illustrated, each of arms 14 has fixed thereto a bifurcated bracket 28 providing a pin connection for a cylinder 26 formed of two telescopically related tubular members. Within the cylinder is a piston 30 (Fig. 2) having a shaft 31 pinned in a bracket 25 fixedly secured at the end of the axle 10.

A conduit 32, 33 extends between each of the cylinders 26 and a power steering control valve 34. This valve comprises a housing 36 for a spool element 38 reciprocal within the housing as determined by the direction the steering wheel of the vehicle is rotated. Thus on a left turn the spool is shifted to the right, on a right turn to the left. Such a valve is illustrated and described in detail, for example, in co-pending application Serial No. 374,346, filed August 14, 1953, now Patent No. 2,815,737 dated Dec. 10, 1957.

As represented in Fig. 2 spool element 38 is shown in its left turn position. In its normal position in the housing, the land 40 is exactly centered over the conduit 42 extending from a source of fluid pressure, indicated as a pump, not shown, while the end lands 43, 44 remain outwardly of the valving edges 46, 48. Thus, with the spool element centered, i.e., with the dirgible wheels of the vehicle 50 (Fig. 1) in their straight ahead position, fluid from the pump circulates through the valve against the static pressure of the fluid in the fluid motor or actuator 52, being returned to the pump via the lines 54, 56. This circulation is also against the static pressure of the residual fluid in the cylinders 26. When the vehicle is following a straight course the lower components of the cylinders 26 on spring deflection reciprocate with little if any interference from the fluid below the pistons.

Motor 52 includes a piston 60 having a shaft 62 extending through an end wall of the cylinder for operative connection with a steering part, e.g., the drag link component of the steering linkage, not shown. Piston 60 like the spool 38 is shown in its left turn position. With the spool centered, the piston, of course, is exactly centered in the cylinder.

On the negotiation of a left turn as illustrated, the fluid flow is partially or completely confined to the left end of the cylinder and to the cylinder 26 forming part of the suspension assembly associated with the dirigible wheel 50 appearing at the left in Fig. 1, this wheel being the outer wheel as the turn is made. The pressure thus developing under the piston 30 in the identified cylinder 26 operates to prevent or reduce deflection of the corresponding spring 20, precluding substantial relative angular movement between the axle 10 and the lower control arm 14 comprised in the suspension assembly. As a consequence, the usually experienced counterclockwise rolling of the vehicle body is avoided with marked improvement in the performance of the vehicle.

It will, of course, be understood that in the case of a right turn the action is just the opposite of that above described. In other words, in such case the right-hand rather than the left-hand cylinder is pressurized or activated to reduce or prevent clockwise roll.

Having so described and illustrated my invention what I claim is:

1. In an automotive vehicle having a suspension comprising a pair of springs located at opposite sides of the center line of the vehicle, said vehicle being equipped with a power steering system including an actuator operably connected to a steering part, a source of power for said actuator, and control means therefor, the combination of a pair of fluid pressure-responsive devices individually associated with said springs and adapted on a pressure change therein to resist deflection of such springs, means for so changing the pressure in said device through said control means, whereby on the negotiation of a turn the device positioned in association with the spring located most outward on the radius of curvature is selectively activated to prevent deflection of such spring, said last-mentioned device on restoration of said control means to its normal position becoming automatically deactivated.

2. In an automotive vehicle having a suspension comprising a pair of springs located at opposite sides of the center line of the vehicle, said vehicle being equipped with a power steering system including an actuator operably connected to a steering part, a source of power for said actuator, and control means therefor, the combination of a pair of fluid pressure-responsive devices individually associated with said springs and adapted when pressurized to resist deflection thereof, a source of fluid pressure for said devices, and means interconnecting said devices and said control means whereby on the negotiation of a turn fluid is discharged from said source into the device positioned in association with the spring which would otherwise deflect with roll of the vehicle body due to centrifugal force, said last-mentioned device on restoration of said control means to its normal position becoming automatically depressurized.

3. In an automotive vehicle having a suspension comprising a pair of springs located at opposite sides of the center line of the vehicle, said vehicle being equipped with a power steering system including a fluid motor operably connected to a steering part, a source of fluid pressure and a valve controlling the fluid flow between said motor and said source, the combination of a pair of fluid pressure-responsive devices individually associated with said springs and adapted when pressurized to resist deflection thereof, and fluid conduits interconnecting said devices and said control valve whereby on the negotiation of a turn fluid is discharged from said source through said valve to pressurize the device positioned in association with the spring which would otherwise deflect with roll of the vehicle body due to centrifugal force, said last-mentioned device on restoration of the vehicle to its straight ahead position becoming depressurized through action of said control valve.

4. In an automotive wheeled vehicle having a suspension comprising a pair of springs located at opposite sides of the center line of the vehicle, said vehicle being equipped with a power steering system including a fluid motor operably connected to a steering part, a source of fluid pressure and a valve controlling the fluid flow between said motor and said source, the combination of a pair of fluid pressure-responsive devices individually associated with said springs and adapted when pressurized to resist deflection thereof, and fluid conduits interconnecting said devices and said control valve whereby on the negotiation of a turn fluid is discharged from said source through said valve to pressurize the device positioned in association with the spring which would otherwise deflect with roll of the vehicle body due to centrifugal force, said last-mentioned device on restoration of the dirigible wheels to their straight ahead position becoming depressurized through action of said control valve.

5. In an automotive wheeled vehicle equipped with a front suspension of the wishbone type, the combination with a power steering system including a fluid motor operably connected to a steering part, a source of fluid pressure and a valve controlling the fluid flow between said motor and said source, of a pair of fluid pressure devices positioned between the lower control arm components of the suspension assemblies and the front axle of the vehicle adapted when pressurized to substantially prevent relative angular movement between said arms and said axle in a vertical plane, and fluid conduits interconnecting said devices and said control valve whereby on the negotiation of a turn fluid is admitted to the device positioned nearest the outer dirigible wheel so as to lessen the roll of the vehicle body due to centrifugal force, said device on restoration of the dirigible wheels to their straight ahead position having substantially no effect on the operation of the associated suspension parts.

6. In an automotive wheeled vehicle equipped with a front suspension of the wishbone type, the combination with a power steering system including a fluid motor operably connected to a steering part, a source of fluid pressure and an open-center spool type valve for controlling the fluid flow between said motor and said source, of a pair of fluid pressure-responsive devices positioned between the lower control arm components of the suspension assemblies and the front axle of the vehicle adapted when pressurized to substantially prevent relative angular movement between said arms and said axle in a vertical plane, and fluid conduits interconnecting said devices and said spool type valve whereby on the negotiation of a turn fluid is admitted from said source to the device positioned nearest the outer dirigible wheel so as to lessen the roll of the vehicle body due to centrifugal force, said device on re-centering of the valve spool being subject only to the normal system pressure and having substantially no effect on the operation of the associated suspension parts.

7. In an automotive vehicle equipped with a power steering system including an actuator operably connected to a steering part, a source of power for said actuator, and control means therefor, the combination of a plurality of fluid pressure-responsive devices each individually associated with a road wheel of the vehicle and means for changing the pressure in said devices through said control means whereby on the negotiation of a turn each of said devices positioned most outward on the radius of curvature are selectively activated to prevent roll of the vehicle body.

References Cited in the file of this patent

UNITED STATES PATENTS

| 2,363,179 | Harrington | Nov. 21, 1944 |
| 2,490,719 | Tank | Dec. 6, 1949 |
| 2,757,938 | Crowder | Aug. 7, 1956 |
| 2,804,311 | Pobanz | Aug. 27, 1957 |

FOREIGN PATENTS

| 521,741 | Great Britain | May 30, 1940 |